April 28, 1925.

C. HAMILTON

ELECTRIC INCUBATOR HEATER

Filed Feb. 28, 1924

Claude Hamilton, INVENTOR.

BY Geo. P. Kimmel, ATTORNEY.

April 28, 1925.

C. HAMILTON

ELECTRIC INCUBATOR HEATER

Filed Feb. 28, 1924    2 Sheets-Sheet 2

1,535,829

Claude Hamilton, INVENTOR.

BY Geo. P. Kimmel, ATTORNEY.

Patented Apr. 28, 1925.

1,535,829

UNITED STATES PATENT OFFICE.

CLAUDE HAMILTON, OF GARNETT, KANSAS.

ELECTRIC INCUBATOR HEATER.

Application filed February 28, 1924. Serial No. 695,731.

*To all whom it may concern:*

Be it known that I, CLAUDE HAMILTON, a citizen of the United States, residing at Garnett, in the county of Anderson and State of Kansas, have invented certain new and useful Improvements in Electric Incubator Heaters, of which the following is a specification.

This invention relates to electric heaters, more particularly to devices of this class employed in incubators, and for like purposes, and has for one of its objects to provide a device of this character which may be installed in various forms of incubators and like structures, and whereby the heat is automatically controlled, to provide a uniform temperature in the egg chamber.

With these and other objects in view the invention consists in certain novel features of construction as hereinafter shown and described and then specifically pointed out in the claim, and in the drawings illustrative of the preferred embodiment of the invention.

Figure 1:
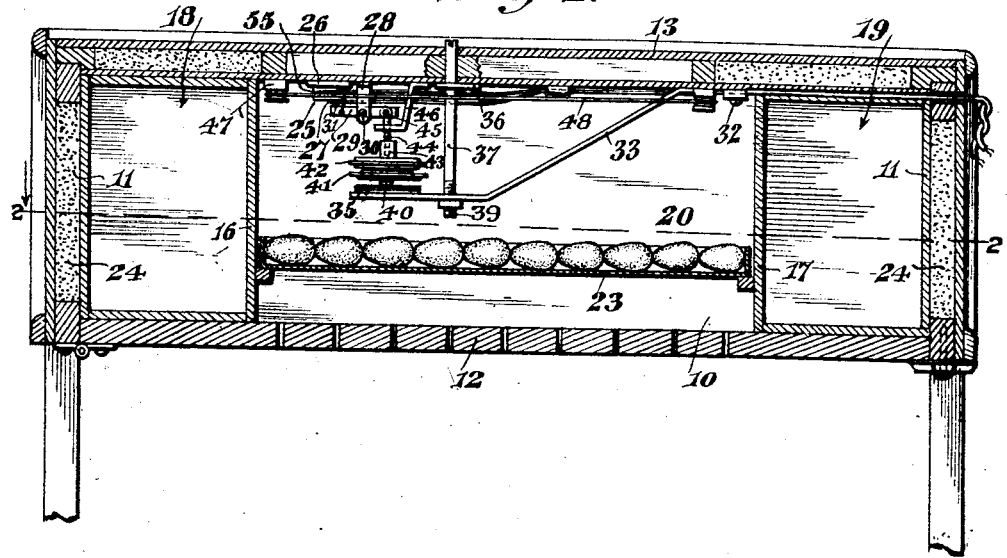
Figure 1 is a longitudinal section of the improved device.
Figure 2:
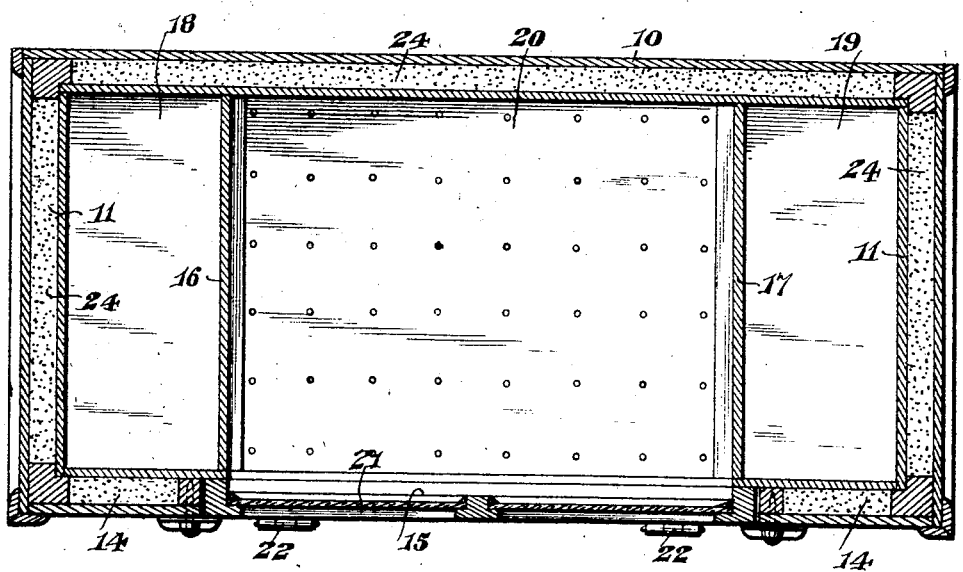
Figure 2 is a plan view in section on the line 2—2 of Figure 1 looking in the direction of the arrow, with the egg tray removed.

This device comprises an enclosing casing consisting of a rear wall 10, end walls 11, bottom 12 and top 13. The front of the casing, comprises end portions 14 and an intermediate closure portion 15. Extending transversely of the casing and spaced from the ends are partitions 16 and 17 dividing the interior into end compartments or closed air chambers 18 and 19 and an intermediate compartment 20, the latter constituting the egg chamber of which the portion 15 is the closure.

The closure 15 is preferably formed with transparent portions 21 to render the interior of the egg chamber visible without opening the closure, and the latter is hingedly united to the casing as shown at 22, to render the egg chamber readily accessible to insert and remove the egg tray one of which is represented at 23.

The outer walls of the casing are double thick and provided with a nonconductive filling as indicated at 24, of sawdust or the like, to protect the contents, in the usual manner.

Connected to the inner face of the top 13 and within the egg chamber 20, is a block 25 insulated at 26 from the casing top and carrying a contact 27.

Figure 3:
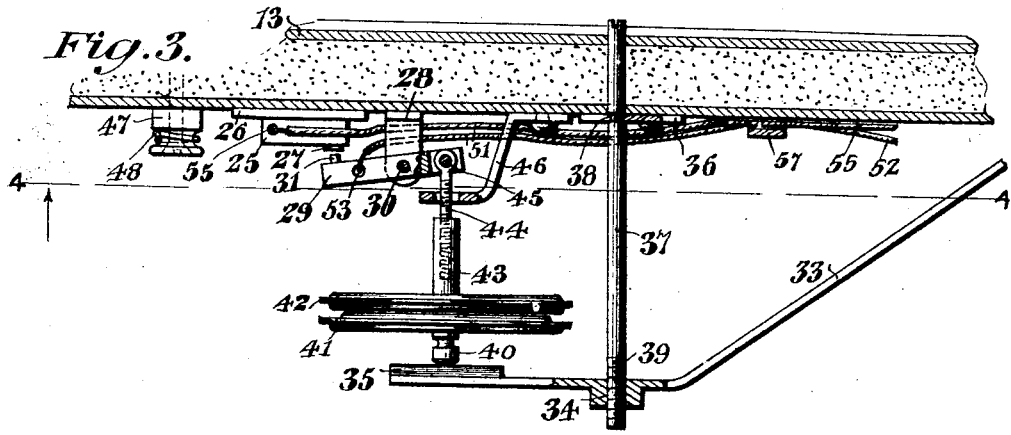
Figure 3 is an enlarged sectional detail of the electrically operated heat control portion of the improved device.

Attached to the inner face of the top 13 of the casing is a hanger 28 in which an arm 29 is pivoted at 30 intermediate the ends and carries an opposing contact 31 engaging the contact 27 when the arm 29 is in one position as shown in Figure 1, and disengaged therefrom when the arm is in another position, as shown in Figure 3.

Attached at 32 to the inner face of the top 13 is an angularly directed resilient arm 33 having a threaded aperture 34 and an insulating plate 35 of fiber or the like. Attached to the under face of the top 13 is a slotted plate 36 in which a rod 37 is rotatively supported as by a channel 38 engaging in the slot. The rod is threaded at 39 to engage the threaded aperture 34 of the member 33 and extends at the upper end through the top 13, and is provided with means for rotating the same, such as a screw driver slit, as shown. By this means, the resilient member 33 may be adjusted toward and away from the top 13 from the exterior of the casing.

Bearing loosely upon the insulating block 35 is a post member 40 connected at its lower side to the lower portion 41 of an expansive member while another post member 43 extends from the upper portion 42 of the expansive member, the latter post member being longitudinally bored and the bore threaded to receive a threaded rod 44 with the upper end of the rod pivoted at 45 to the armature bar 29. A guide bracket 46 is attached to the under face of the top 13 and is longitudinally slotted to slidably receive the post member 43 and support it from displacement.

Figure 4:
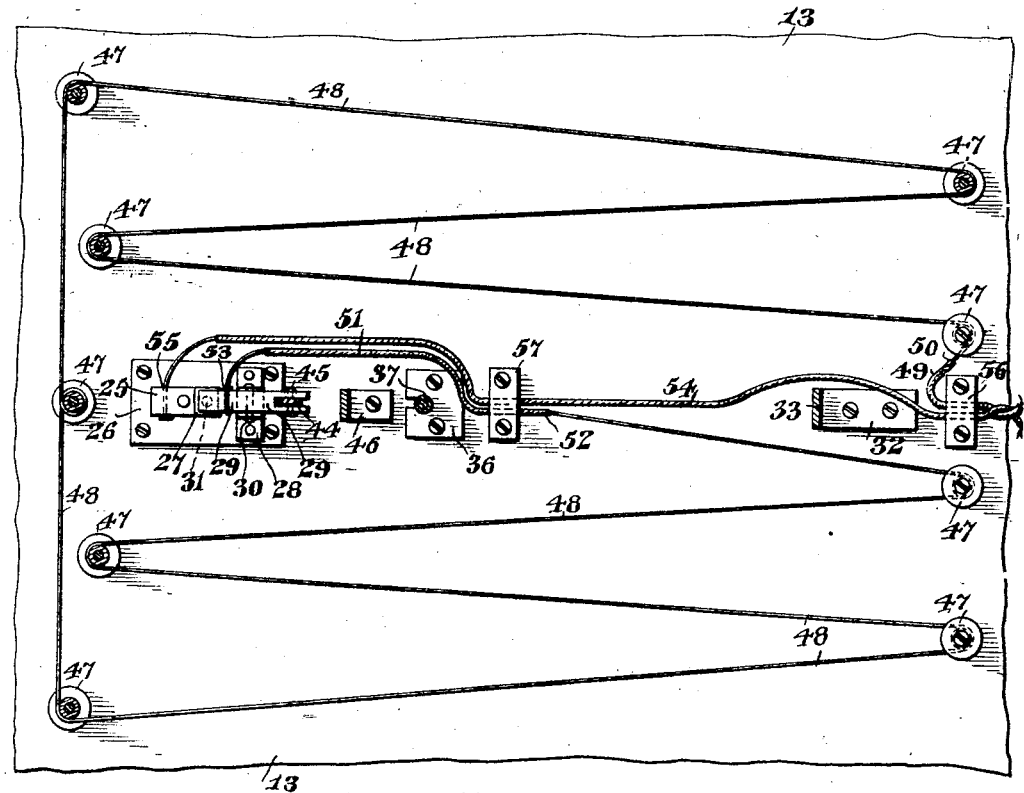
Figure 4 is a plan view from beneath, of portions of the device shown in Figure 3, and in section of the line 4—4 of Figure 3.

Attached to the under face of the top 13 of the casing are a plurality of insulator members 47 around which a thin wire or heating unit member 48 is woven back and forth, as shown in Figure 4. A larger conductor wire, represented at 49, is connected to the heating unit wire 48 at one end at 50, while a larger conductor wire 51 is connected at 52, to the other end of the smaller wire 48.

The conductor 51 is connected at 53 to the armature bar 29, while another larger conductor 54 is connected at 55 to the member 25. The two conductor members 49 and 54 are coupled at 56 to the top 13, while the conductor members 51 and 54 are coupled at 57 to the top 13. The conductors 49 and 54 lead from a source of electric energy, not shown.

The element 41—42 when at normal temperature, and contracted, holds the post 43 and the rod 44 in their lower position, and the contacts 27 and 31 in engagement and the circuit closed, and the member 48 heated by its resistance to the current passing therethrough.

By adjusting the members 33 and 44 the degree of movement of the element 41—42 may be accurately controlled to correspondingly control the degree of heat radiated by the element 48. The egg chamber 20 is thus heated to the required degree. If however the heat rises above the predetermined degree, the element 41—42 by expanding tilts the bar 29 on its pivot 30 and thus breaks the circuit through the conductor elements and correspondingly reduces the temperature.

When the temperature decreases to an extent sufficient to cause the element 41—42 to detract, the circuit is again closed and the heating property of the member 48 restored. The temperature of the egg chamber is thus automatically controlled and retained at a uniform degree.

The dead air chambers 18—19 at the ends of the incubating or egg chamber materially increase the efficiency and utility of the device.

The device is simple in construction, can be inexpensively manufactured, and of any required size or material.

The preferred embodiment of the invention is disclosed in the drawings and set forth in the specification, but it will be understood that modifications within the scope of the claimed invention may be made in the construction without departing from the principle of the invention or sacrificing any of its advantages.

What is claimed is:

In a device of the class described, a stationary support, a combined supporting rod and adjusting member threaded at one end and mounted for rotation in the stationary support and extending externally of the same, said extended portion having means for the application of a turning implement, a movable supporting member attached at one end to the stationary support and with a threaded aperture engaged by the threaded rod, a diaphragm actuated member bearing upon said movable support, a lever arm mounted to swing and with an electric contact at one end and pivoted at the other end to said diaphragm operated means, and an electric contact adapted to be engaged by the contact of said lever arm when the diaphragm member is expanded, said contacts being connected into an electric circuit.

In testimony whereof, I affix my signature hereto.

CLAUDE HAMILTON.